July 30, 1929. K. BRENKERT ET AL 1,722,976
PROJECTION APPARATUS
Filed Nov. 1, 1928  2 Sheets-Sheet 1

Inventor
Karl Brenkert,
Joseph W. Brenkert.
By
Attorneys

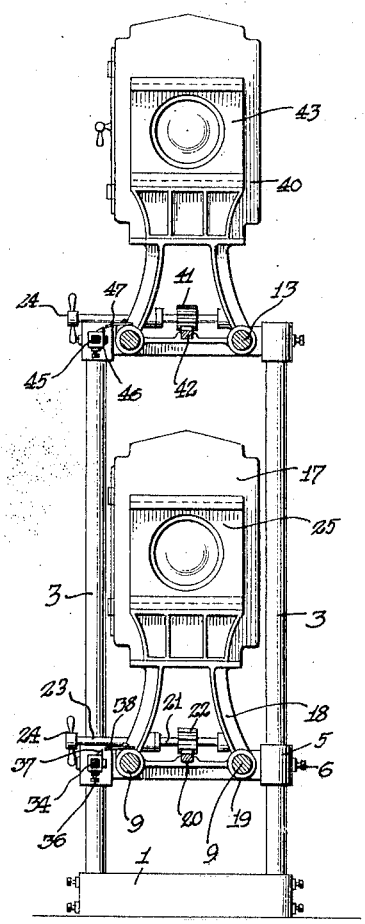
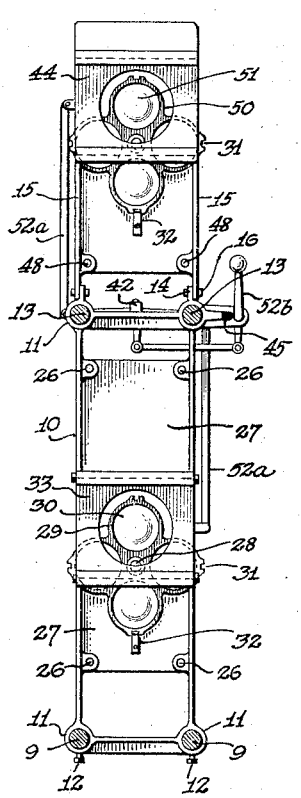
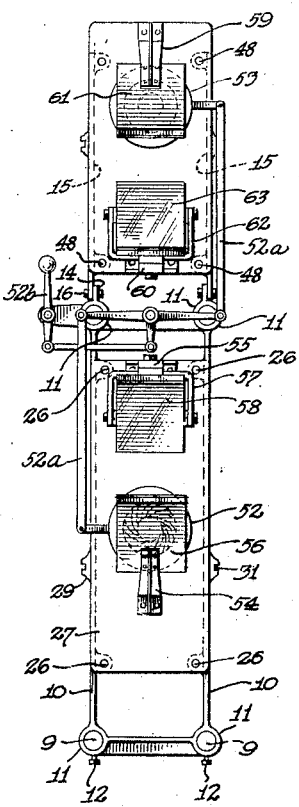

Patented July 30, 1929.

1,722,976

UNITED STATES PATENT OFFICE.

KARL BRENKERT AND JOSEPH W. BRENKERT, OF DETROIT, MICHIGAN.

PROJECTION APPARATUS.

Application filed November 1, 1928. Serial No. 316,392.

The present invention pertains to a novel projection apparatus constructed particularly for use in theatres for the purpose of throwing a beam of light on the stage or screen.

The principal object of the invention is to provide a device of this character whereby projected illuminated areas of various sizes and intensities may be rapidly produced, particularly by adjusting the light source in its distance from the projection lens and by quickly inserting a lens of corresponding focal length into position. The frame on which the light source is slidably mounted preferably has a graduated member with demarcations indicating predetermined positions of the light source for a given program. In advance of the light source is provided a movable frame carrying a series of lenses corresponding to the predetermined indicated adjustments on the graduated member. Any one of these lenses may be brought into the projection path of the light source when the latter is set in the corresponding position on the frame.

The apparatus preferably comprises two such units, either one of which may be set for a given character of projection well in advance of the instant when it is to be used, so that the operator may shift from the other to the pre-adjusted unit promptly and without an interruption in the program.

The invention is fully disclosed by way of example in the following description and in the accompanying drawings in which—

Figure 2:
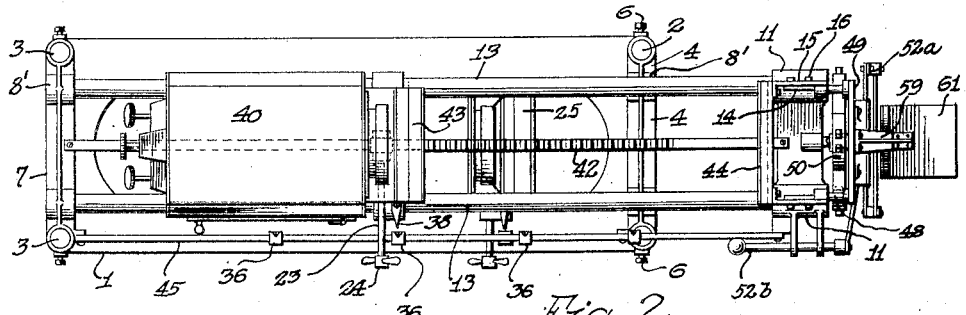
Figure 1:
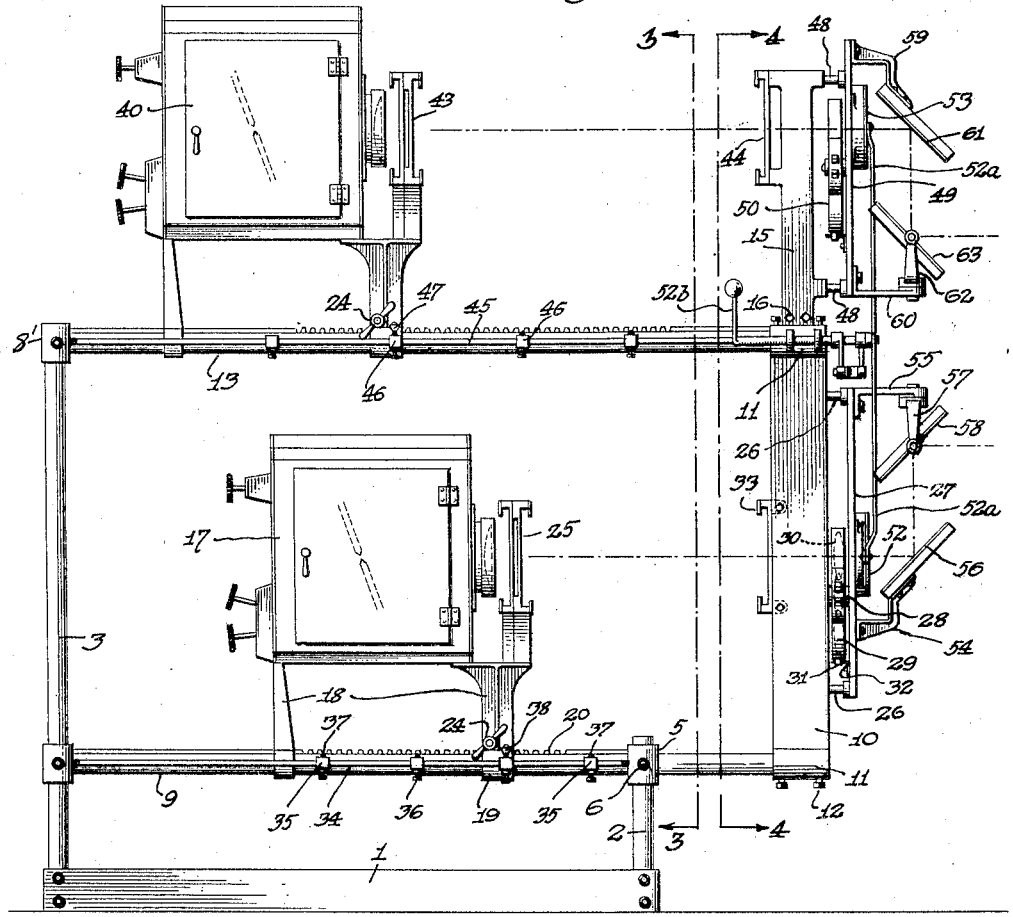

Fig. 1 is a side elevation of the apparatus;
Fig. 2 is a plan view;
Fig. 3 is a section on the line 3—3 of Fig. 1;
Fig. 4 is a vertical section on the line 4—4 of Fig. 1; and
Fig. 5 is a front elevation.

Reference to these views will now be had by use of like characters which are employed to designate corresponding parts throughout.

The frame of the apparatus stands on a rectangular base member 1 having a pair of short uprights 2 at its forward end and a pair of considerably longer uprights 3 at its rear end. Transverse members 4 are bridged across the members of the respective pairs of uprights. Each such member is formed at its ends with flanges 5 receiving the uprights and secured thereto by set screws 6. It will be seen by reference to Fig. 1 that two such members are provided on the same level on the uprights 2 and 3, and that a third such member 7 is provided at the upper ends of the uprights 3. Each transverse member is formed near its ends with a pair of bearings 8. A pair of frame rods 9 have their rear ends received in the alined bearings of the lower transverse members 4, and are extended somewhat forwardly of the uprights 2 as apparent in Figs. 1 and 2.

A forward rectangular frame member 10 equipped at its corners with sleeves 11 has the lower sleeves mounted on the forward ends of the rods 9 and secured thereto by set screws 12. The upper sleeves 11 of the frame member 10, in conjunction with the bearings 8' of the upper transverse member 7, support a pair of frame rods 13 of the same length and in the same vertical planes as the lower frame rods 9. The upper sleeves 11 of the frame member 10 have lugs 14 extending upwardly therefrom, and to these lugs is secured an upper vertical frame member 15 by means of bolts 16 for a purpose which will presently appear.

A light source 17 of conventional construction, such as the arc type, is slidably supported on the lower frame rods 9 by means of its base structure 18 which has sleeves 19 surrounding the rods. A rack 20 is secured by the lower transverse members 4 in parallel relation to the rods 9, and in the base structure 18 is journaled a shaft 21 carrying a pinion 22 meshing with this rack. The shaft is extended laterally from the frame as at 23 and is there equipped with a hand wheel 24 by which it may be rotated in order to move the light source on the rods 9. On the base structure 18 is mounted a receptacle 25 for receiving rotary scenic effects, framing shutters, color screens or other modifying devices.

Studs 26 projecting from the forward face of the forward frame member 10 support a plate member 27. Between this member and the frame section 10 is another stud 28 on which is rotatably mounted a lens holder 29 carrying a series of lenses 30 of different focal lengths. The various lenses may selectively be brought into the projection path of the light source 17, and the setting of any given lens in this position is secured by notches 31 formed in the holder 29 and adapted to receive a spring clip 32 on the inner face of the plate 27. At the inner side of the frame section 10 is a receptacle 33 in line with the receptacle 25 and adapted for supporting modifying devices such as those mentioned in connection with the latter.

The lower transverse members 4 support a transverse bar 34 of square cross section and preferably lying at the outer side of one of the rods 9 and parallel thereto. A number of blocks 35 slidable on the rod may be secured in selected positions thereon by means of set screws 36. These blocks correspond in number with the lenses in the carrier 29 and are each equipped with a point 37 adapted for cooperation with a pointer 38 carried by the base structure 18. The blocks 35 are set in positions, which, when occupied by the pointer 38, will bring the light source into the foci of the several lenses 30. If the lenses are changed, the positions of the blocks 35 should also be changed. Thus, when the operator brings any given lens into the light path, he need only move the light source until the pointer 38 registers with the corresponding block 35.

In the upper rods 13 is mounted another light source 40 in the manner described in connection with the member 17. The base of this light source carries a pinion 41 cooperating with the rack 42 supported by the upper transverse member 7 and the top of the front frame member 10. The upper structure has accessories similar to those described in connection with the functioning of the light source 17, such as receptacles 43 and 44 carried respectively by the light source and the upper frame member 15, a square rod 45 supported adjacent one of the upper frame rods 13, blocks 46 adjustably mounted on the square rod, and the pointer 47 carried by the base structure of the light source 40 and cooperating with the blocks 46. At the forward side of the frame member 15 are studs 48 supporting a plate 49 on which is rotatably mounted a lens holder 50 carrying lenses 51 of different focal lengths and adapted for selective insertion in the projection path of the light source 40. These lenses function in cooperation with the light source 40 and the adjustments determined by the blocks 46, in the manner described in connection with the lower light source 17.

The plates 27 and 49 are apertured in the projection paths of the light sources and are equipped with dissolving shutters 52 and 53 operated in the conventional manner by linkage 52$^a$ and a handle 52$^b$.

The plate 27 carries a lower bracket 54 and an upper plate 55, the former supporting a reflector 56 in the projection path of the source 17. A yoke 57 is pivotally suspended from the member 55 and supports in pivotal manner a projection reflector 58 which receives light from the member 56 and throws it upon the screen or stage.

A similar structure is provided on the plate 49, including an upper bracket 59 and a lower bracket 60. The upper bracket carries a reflector 61 in the projection path from the source 40, and the lower bracket supports a pivotal yoke 62 which in turn supports a pivoted projecting reflector 63 adapted to receive light from the member 61.

The use of the light sources 17 and 40 has already been indicated. It is to be noted in this connection that various projected areas of illumination are obtainable without longitudinal adjustment of the front end of the device, so that the apertures in the front wall of the projection room may be maintained at a minimum size in keeping with modern structural requirements and building ordinances.

In the combined use of the two light sources, it is possible for the operator to change the connection of the projected light without delay. In such case, one of the light sources and the lenses associated therewith are preset for a future condition in the program. The operator makes this adjustment at his convenience well in advance of the time when it is needed. At the required instant, the operator merely turns on the light source which has been preset, and it will be obvious that he is not required to spend time in making any adjustments at the instant.

Although a specific embodiment of the invention has been fully described, it will be apparent that various alterations in the details of construction may be made without departing from the scope of the invention as indicated by the appended claims.

What we claim is:—

1. In a projection apparatus, a supporting frame, a light source adjustable longitudinally of said frame, a movable lens frame supported in advance of said light source, and a set of lenses of various focal lengths mounted in said frame adapted for insertion in the projection path of said light source.

2. In a projection apparatus, a supporting frame, a light source adjustable longitudinally of said frame, a lens frame rotatably supported in advance of said light source, and lenses of various focal lengths mounted in said lens frame and adapted respectively for insertion in the projection path of said light source.

3. In a projection apparatus, a supporting frame, a light source adjustable longitudinally of said frame, and a set of lenses of various focal lengths adapted for insertion in the projection path of said light source, demarcations on said frame for indicating positions of said light source and corresponding to the focal lengths of the respective lenses.

4. In a projection apparatus, a supporting frame, a light source adjustable longitudinally of said frame, a lens frame rotatably supported in advance of said light source, and lenses of various focal lengths mounted in said lens frame and adapted respectively for insertion in the projection path of said light source, demarcations on said frame for indicating positions of said light source and corresponding to the focal lengths of the respective lenses.

5. In a projection apparatus, a supporting frame, a pair of light sources adjustable longitudinally of said frame, and a set of lenses of various focal lengths for said light sources, said lenses being separately adapted for insertion in the projection path of the corresponding light source.

6. In a projection apparatus, a supporting frame, a pair of light sources adjustable longitudinally of said frame, and a set of lenses of various focal lengths for said light sources, said lenses being separately adapted for insertion in the projection path of the corresponding light source, and a member associated with each light source for indicating positions of said light sources, said members having demarcations corresponding to the focal lengths of the respective lenses.

7. In a projection apparatus, a frame, a light source slidably mounted thereon, a rack and pinion device between said frame and light source for sliding the latter on said frame, and a set of lenses of various focal lengths adapted for insertion in the projection path of said light source.

8. In a projection apparatus, a supporting frame, a pair of light sources adjustable longitudinally of said frame, a rack and pinion device between each light source and the frame for adjusting the light sources on the frame, and a set of lenses of various focal lengths for said light sources, said lenses being separately adapted for insertion in the projection path of the corresponding light source.

9. In a projection apparatus, a frame, a light source slidably mounted thereon, a rack and pinion device between said frame and light source for sliding the latter on said frame, and a set of lenses of various focal lengths adapted for insertion in the projection path of said light source, demarcations on said frame for indicating positions of said light source and corresponding to the focal lengths of the respective lenses.

10. In a projection apparatus, a supporting frame, a pair of light sources adjustable longitudinally of said frame, a rack and pinion device between each light source and the frame for adjusting the light sources on the frame, and a set of lenses of various focal lengths for said light sources, said lenses being separately adapted for insertion in the projection path of the corresponding light source, and a member associated with each light source for indicating positions of said light sources, said members having demarcations corresponding to the focal lengths of the respective lenses.

In testimony whereof we affix our signatures.

JOSEPH W. BRENKERT.
KARL BRENKERT.